(12) United States Patent
Dufaure et al.

(10) Patent No.: US 8,865,806 B2
(45) Date of Patent: Oct. 21, 2014

(54) MOLECULES CARRYING ASSOCIATIVE GROUPS AND USE THEREOF AS PLASTICISERS

(75) Inventors: Nicolas Dufaure, Bernay (FR); Julien Jouanneau, Corneville sur Risle (FR); Guillaume Le, Colombelles (FR); Jean-Luc Couturier, Lyons (FR); Manuel Hidalgo, Brignais (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/643,831

(22) PCT Filed: Apr. 18, 2011

(86) PCT No.: PCT/FR2011/050877
§ 371 (c)(1),
(2), (4) Date: Jan. 4, 2013

(87) PCT Pub. No.: WO2011/135227
PCT Pub. Date: Nov. 3, 2011

(65) Prior Publication Data
US 2013/0210972 A1    Aug. 15, 2013

(30) Foreign Application Priority Data
Apr. 27, 2010  (FR) .................................... 10 53208

(51) Int. Cl.
*C08K 5/3445*  (2006.01)
*C08K 5/435*  (2006.01)
*C08K 5/34*  (2006.01)
*C08K 5/00*  (2006.01)

(52) U.S. Cl.
CPC ................. *C08K 5/3445* (2013.01); *C08K 5/34* (2013.01); *C08K 5/435* (2013.01); *C08K 5/0016* (2013.01)

USPC .......................................... 524/106

(58) Field of Classification Search
CPC ......... C08K 5/34; C08K 5/435; C08K 5/3445
USPC ...................... 524/106; 548/323.5
See application file for complete search history.

(56) References Cited

U.S. PATENT DOCUMENTS

| | | | |
|---|---|---|---|
| 3,420,837 A | 1/1969 | Skau et al. | |
| 5,188,745 A * | 2/1993 | Migdal et al. | 508/255 |
| 7,312,263 B2 | 12/2007 | Schmid et al. | |
| 2008/0221272 A1* | 9/2008 | Tournilhac et al. | 525/194 |
| 2010/0135940 A1* | 6/2010 | Grimaldi et al. | 424/62 |

FOREIGN PATENT DOCUMENTS

| | | |
|---|---|---|
| EP | 0 584 967 | 3/1994 |
| EP | 0 743 305 | 11/1996 |
| EP | 1 550 696 | 7/2005 |
| WO | WO 2006/016041 | 2/2006 |
| WO | WO 2008/029065 | 3/2008 |

OTHER PUBLICATIONS

International Search Report for PCT International Application No. PCT/FR2011/050877 dated Apr. 11, 2011.
International Search Report for PCT International Application No. PCT/FR2011/050878 dated Sep. 26, 2011.
Office action for U.S. Appl. No. 13/643,867, dated Mar. 14, 2014.

* cited by examiner

*Primary Examiner* — Michael M Bernshteyn
(74) *Attorney, Agent, or Firm* — RatnerPrestia

(57) ABSTRACT

The invention relates to the field of plasticizers, compounds used as additives in polymers for facilitating the transformation thereof or modifying the mechanical properties thereof, especially rigidity.

17 Claims, No Drawings

MOLECULES CARRYING ASSOCIATIVE GROUPS AND USE THEREOF AS PLASTICISERS

This is a U.S. National Phase application of International Application Number PCT/FR2011/050877, filed Apr. 18, 2011, which claims priority benefit of FR 1053208, filed Apr. 27, 2010, both of which are incorporated herein by reference in their entirety for all purposes.

FIELD OF THE INVENTION

The present invention relates to the field of plasticizers, compounds used as additives in polymers to facilitate their conversion or to modify their mechanical properties, in particular their stiffness.

BACKGROUND OF THE INVENTION

Many disadvantages are associated with the use of plasticizers. Mention may be made, among these disadvantages, of:
  their tendency to migrate toward the surface or the interfaces of the manufactured articles based on polymer formulations comprising them or toward liquids which may be in contact with such articles, and
  their volatility.

These two migration and volatility mechanisms have, as undesirable consequence, the deterioration in the properties of the polymer formulation, by loss of plasticizer, and the release into the environment of organic compounds which are sometimes toxic.

There thus exists a continual need for novel plasticizers exhibiting a lower volatility and/or tendency toward migration than that of conventional plasticizers.

SUMMARY OF THE INVENTION

The subject matter of the invention is thus the use, as plasticizer in a plastic, of a molecule carrying at least one associative group comprising a dinitrogenous or trinitrogenous heterocycle.

DETAILED DESCRIPTION OF THE INVENTION

The term "plasticizer" is understood to mean, within the meaning of the present invention, a compound corresponding to one and advantageously two, three or all of the following definitions:
  (1) It is a product which meets the definition given in the standard ASTM D883, entitled "Plastics Nomenclature", published by "American Society for Testing of Materials, Philadelphia, Pa.".
  (2) It is a compound which, when it is added to a plastic or elastomeric polymer, is capable of modifying the flexibility, the processability, the distensibility, the viscosity or the mechanical strength thereof.
  (3) It is a compound which, when it is added to a polymer, reduces the viscosity, the hardness, the mechanical modulus, the energy necessary for the formulating or processing, the heat of mixing during the processing thereof, increases the elongation at break, the flexibility, the energy at break strength, or the mechanical fatigue strength thereof.
  (4) It is a compound which, when it is added to a polymer, modifies the glass transition temperature thereof and in particular lowers the glass transition temperature of a polymer by at least 2° C., by at least 3° C. or at least 4° C., advantageously by at least 5° C., when it is added in a sufficient amount. The fall in the glass transition temperature depends on the amount of plasticizing compound in the composition. This amount must be such that it is sufficient to bring about an effective decrease in or lowering of the glass transition temperature of the polymer.

Advantageously, the term "plasticizer" is understood to mean a compound corresponding to the definition (4) above.

The glass transition temperature or Tg is a property associated with amorphous and semicrystalline polymers (due to the existence, in these, of an amorphous part). The Tg of a polymer can be measured by various techniques capable of detecting a major change in a property on passing through the Tg, such as dilatometry or calorimetry, as a result of the changes in specific volume or in heat capacity associated with the system passing through its Tg. The other properties which make it possible to detect the Tg also include the refractive index or the stiffness (expressed in the form of hardness, mechanical moduli, and the like). As the Tg is associated physically with molecular mobility, the techniques capable of translating phenomena related to this mobility, such as dielectric spectroscopy, nuclear magnetic resonance, dynamic mechanical analysis, and the like, can also be used to detect the Tg.

The Tg is measured by applying an upward or downward temperature gradient to the sample (and optionally to the reference, as in differential calorimetry).

In the context of the invention, the glass transition temperature of the polymer is measured either by calorimetry or by dynamic mechanical analysis. Thus, a compound is a plasticizer according to the invention as soon as one or both measurement methods make it possible to find a fall in the Tg of the polymer of at least 2° C., of at least 3° C. or of at least 4° C., advantageously of at least 5° C., when it is added in a sufficient amount.

The calorimetry measurement is carried out using a differential scanning calorimeter, for example the calorimeter sold under the MDSC 2920 name or under the Q2000 name, by TA Instruments, by the "Differential Scanning calorimetry" or DSC technique. The calorimeter makes it possible to measure the difference in energy necessary in order to maintain at the same temperature, during the test, a sample of the product and a reference cell containing only air. Tests can be carried out with this apparatus under isothermal conditions or under temperature gradient conditions. For Tg measurements, an upward or downward temperature gradient, fixed at a rate of 10 or 20° C./min, is applied. The Tg is measured in the glass transition region, either at the first inflexion point of the DSC signal in the upward gradient or at the central point of the transition.

To evaluate the fall in the glass transition temperature brought about by the plasticizing compound, the starting operation is to measure the glass transition temperature of the polymer by one of the methods described above, then a mixture of the polymer and the compound is prepared and the measurement is carried out by the same method and under the same conditions.

The dynamic mechanical analysis is carried out according to the method described in detail below. The sample not comprising plasticizing compound and the sample comprising it are also compared by carrying out measurements under the same conditions. The signals given by the dynamic mechanical analysis are the complex modulus M*, the real and imaginary parts M' and M" respectively of the complex modulus and the tangent delta, defined as the M"/M' ratio. Once the glass transition region has been identified, the Tg value is taken, by convention, either at the maximum of the M" signal or at the maximum of the tangent delta signal or at the first inflexion point of the M' or M* signal. It is accepted that the value obtained at the M" maximum in dynamic mechanical analysis is in good agreement with the Tg value obtained by calorimetry at the first inflexion point of the DSC signal in the upward gradient at a rate of 10° C./min.

(5) It is a product which, when it is added to a polymer, reduces the elastic modulus at a given temperature. More specifically, the plasticizer reduces the Young's elastic modulus E or the shear modulus G at a given temperature or within a given temperature range. The temperature range at which this decrease in the modulus with respect to the modulus of the nonplasticized product takes place is an advantageous range for the applications of the material. Advantageously, the temperature range to which the modulus of the modified material is decreased is a range from −50° C. to 250° C. The measurements of modulus as a function of temperature can be carried out with different measurement tests or devices, such as small- or large-deformation mechanical tests.

The measurements of Young's elastic modulus as a function of the temperature, which make it possible to determine if a compound is a plasticizer according to the invention, are carried out by small-deformation mechanical tests using a dynamic mechanical analysis or DMA device, such as, for example, the DMA Q800 device from TA Instruments.

Dynamic mechanical analysis has as principle the periodic stressing of the sample, the response of which to this stress is also periodic and more or less shifted in time. For essentially elastic materials, this shift is virtually zero whereas, for materials having viscoelastic behavior (highly characteristic of the polymer systems), this shift is significant and proportional to the viscoelastic nature. The tests are generally carried out by application of a sinusoidal stress (prompting) which brings about a sinusoidal strain (response). The two signals are thus more or less shifted (phase shift). The stress is chosen so as to bring about a strain which is sufficiently small to remain within the range of study of the linear viscoelasticity, where stress and strain are related by a parameter independent of the stress applied, the dynamic modulus.

During the periodic small-amplitude strain, work is applied to the sample. During a strain cycle, a portion of this work is reversibly stored in the sample. The other portion of the work is irreversibly converted into heat by the molecular movements. The reversible portion of the work is proportional to the mechanical storage modulus and the irreversible portion is proportional to the mechanical loss modulus. These two quantities can be respectively represented as the real part (M') and the imaginary part (M") of the complex dynamic modulus M*. When tensile or bending tests are carried out, the term used is the Young's dynamic modulus (E*=E'+iE") and, when shearing or torsion tests are carried out, the term used is the dynamic shear modulus (G*=G'+iG"). The phase shift in angle (δ) between the stress and the strain appears as a consequence of the dissipation of energy (viscoelasticity). The loss factor tan δ=E"/E' (or G"/G') measures the relative loss of energy.

The DMA Q800 device (TA Instruments) carries out measurements with sinusoidal strains in the linear range at constant frequency, for example of 1.0 Hz. The E*, E', E" and tan δ measurements are carried out as a function of the temperature in order to demonstrate the differences in the modulus between a pure plasticizer-free polymer and the polymer additivated with a plasticizer. More specifically, monitoring of the complex modulus E* or of the real part E' are used to demonstrate the plasticizing effect (decrease in modulus with respect to the modulus of the nonplasticized polymer) in the temperature range of interest. The gradient rate for the variation in temperature is controlled and is 1° C./min, 2° C./min or 3° C./min.

The term "carrying" within the meaning of the present invention signifies that the molecule and the associated group are bonded via one or more covalent bonds.

The term "associative groups" is understood to mean groups capable of associating with one another via hydrogen, ionic and/or hydrophobic bonds. They are, according to a preferred form of the invention, groups capable of associating via hydrogen bonds, comprising a di- or trinitrogenous heterocycle, generally having 5 or 6 atoms, advantageously a dinitrogenous heterocycle, and comprising at least one carbonyl functional group.

When the associative groups are capable of associating via hydrogen bonds, each associative group comprises at least one donor site and one acceptor site with regard to the hydrogen bond, so that two identical associative groups are self-complementary and can associate with one another with the formation of at least two hydrogen bonds.

Advantageously, the associative group is chosen from an imidazolidinyl, bis-ureyl or ureido-pyrimidyl group, advantageously an imidazolidinyl group.

Advantageously, said molecule carrying at least one associative group is obtained by reacting, with a precursor molecule, an associative group corresponding to one of the following formulae:

(1)

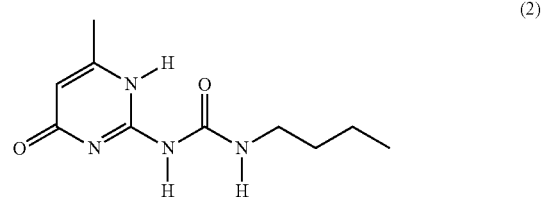

(2)

(3)

where:

R denotes a group of formula T-(G)$_n$- in which T is a reactive functional group capable of forming a covalent bond with a precursor molecule, n has a value 0 or 1 and G is a linear or branched $C_1$-$C_{24}$, advantageously $C_1$-$C_{10}$, alkylene chain optionally interrupted by one or more nitrogen atoms, more advantageously a linear $C_1$-$C_6$ alkylene chain;

R' denotes a hydrogen atom,

A denotes an oxygen or sulfur atom, advantageously an oxygen atom.

Advantageously, the reactive functional group T- is chosen from an acid, anhydride, alcohol, mercaptan, amine, epoxy and isocyanate functional group.

The associative group can be chosen from 1-(2-aminoethyl)imidazolidone [UDETA], 1-(2-hydroxyethyl)imidazolidone [HEIO], 1-(2-[(2-aminoethyl)amino]-ethyl)imidazolidone [UTETA], 1-(2-[2-{2-aminoethylamino}ethylamino]ethyl)-imidazolidone [UTEPA] and N-(6-aminohexyl)-N-(6-methyl-4-oxo-1,4-dihydropyrimidin-2-yl)urea [Upy].

The compounds UDETA, UTETA and UTEPA can be obtained by reaction of urea with a polyamine. For example, UDETA, UTETA and UTEPA can be respectively prepared by reacting urea with diethylenetriamine (DETA), triethylenetetramine (TETA) and tetraethylenepentamine (TEPA). The compound HEIO can be obtained by reaction of urea with the corresponding diaminoalcohol, namely 2-[(2-aminoethyl)amino]ethanol.

Advantageously, the precursor molecule which will become the carrier molecule after reaction with the associative group is a linear or branched alkylene chain comprising from 1 to 70 carbon atoms, advantageously from 1 to 50 carbon atoms, entirely advantageously from 1 to 30 carbon atoms or from 1 to 10 carbon atoms, optionally interrupted by one or more aromatic or aliphatic rings. Said chain can be substituted by one or more heteroatoms chosen from sulfur, oxygen, phosphorus and nitrogen and said chain can in addition optionally include one or more ether, ester or amide bridges and optionally one or more epoxy units.

Advantageously, the precursor molecule is chosen from adipates, such as diethyl adipate, di(2-ethylhexyl)adipate or dimethoxyethyl adipate, azelates, such as dicyclohexyl azelate, di(2-ethylhexyl)azelate or diisobutyl azelate, sebacates, such as dimethyl sebacate, dibutyl sebacate or diisooctyl sebacate, phthalates, such as dimethyl phthalate, dibutyl phthalate, di(2-ethylhexyl)phthalate, diisooctyl phthalate or diisononyl phthalate, trimellitates, such as trioctyl trimellitate, trinonyl trimellitate, triisodecyl trimellitate or tri(2-ethylhexyl)trimellitate, phosphates, such as triethyl phosphate, triphenyl phosphate or tricresyl phosphate, citrates, such as triethyl citrate or tri(2-ethylhexyl)citrate, benzenesulfonamide derivatives, such as butylbenzenesulfonamide and hydroxypropylbenzenesulfonamide, glycolic esters, such as ethylene glycol dibutyrate, glycerol diacetate, glycerol triacetate or diethylene glycol dipropionate, epoxidized soybean oil, epoxidized linseed oil or epoxidized pine oil (or tall oil) fatty acids.

The precursor molecule can also be a polymer.

Advantageously, the molecule carrying associative groups exhibits a molecular weight of between 30 and 2000 g/mol, advantageously of between 30 and 1000 g/mol and entirely advantageously of between 30 and 500 g/mol.

Mention may be made, among the plastics capable of being plasticized by the molecule carrying associative groups, of cellulose derivatives, such as cellulose acetate, cellulose acetate butyrate, cellulose nitrate or ethylcellulose, polyamides, such as homo- and copolymers obtained by polymerization of lactam (in particular caprolactam or lauryllactam) monomers and/or am-aminocarboxylic acids (such as 11-aminoundecanoic acid or 12-aminododecanoic acid), polymers composed of monomers obtained by reaction of an aliphatic, cycloaliphatic or aromatic C6-C14 dicarboxylic acid (such as adipic acid, sebacic acid and n-dodecanedioic acid) with an aliphatic, cycloaliphatic, arylaliphatic or aromatic C6-C22 diamine (such as hexamethylenediamine, m-xylylenediamine or p-xylylenediamine), copolymers comprising monomers of the 2 families of polyamides mentioned above, acrylic homo- and copolymers, such as polymethyl methacrylate and its copolymers, polycarbonate, styrene polymers, such as polystyrene, polyesters, such as polyethylene terephthalate (PET) or polybutylene terephthalate (PBT), halogenated vinyl polymers, such as polyvinyl chloride (PVC), polyvinyl fluoride, polyvinylidene chloride or polyvinylidene fluoride (PVDF), acrylonitrile copolymers, polyethers and polymers of vegetable or bacterial origin, such as poly(lactic acid) or polyhydroxyalkanoates, polyvinyl acetate, polyvinylbutyral, thermoplastic or nonthermoplastic elastomers, such as natural rubber, polybutadiene, synthetic polyisoprene, optionally hydrogenated polychloroprene, polyisobutylene, block copolymers of polybutadiene and isoprene with styrene which are optionally hydrogenated, such as poly(styrene-b-butadiene) (SB), poly(styrene-b-butadiene-b-styrene) (SBS), poly(styrene-b-isoprene-b-styrene) (SIS), poly(styrene-b-(isoprene-stat-butadiene)-b-styrene) or poly(styrene-b-isoprene-b-butadiene-b-styrene) (SIBS), hydrogenated SBS (SEBS), poly(styrene-b-butadiene-b-methyl methacrylate) (SBM), which is optionally hydrogenated (SEBM), poly(methyl methacrylate-b-butyl acrylate-b-methyl methacrylate) (MAM), poly(styrene-b-butyl acrylate-b-styrene (SAS), random copolymers of butadiene with styrene (SBR) and acrylonitrile (NBR) which are optionally hydrogenated, butyl or halogenated rubbers, polyethylenes, polypropylenes, silicone elastomers of general formula —(Si(R)(CH3)-O)n- with CH3 and R bonded to the silicon atom and the latter bonded to the oxygen atom, it being possible for R to be a methyl, phenyl, vinyl, trifluoropropyl or 2-cyanoethyl radical, ethylene/vinyl alcohol copolymers, ethylene/propylene and ethylene/propylene/diene copolymers, copolymers of ethylene with acrylic and vinyl monomers, such as copolymers of ethylene and vinyl acetate, available from Arkema under the Evatane® tradename, copolymers of ethylene, vinyl acetate and maleic anhydride, available from Arkema under the Orevac® tradename, copolymers of ethylene and acrylic ester, available from Arkema under the Lotryl® tradename, copolymers of ethylene, acrylic ester and maleic anhydride, available from Arkema under the Lotader® tradename, copolymers of ethylene, acrylic ester or functional acrylic ester, such as glycidyl acrylate or methacrylate, available from Arkema under the Lotader® tradename, flexible acrylic polymers or copolymers, such as resins based on methacrylic esters, for example polybutyl acrylate and its copolymers with styrene, or on other acrylic or vinyl monomers, polyamide/polyether multiblock copolymers, such as those available from Arkema under the Pebax® tradename, elastomers based on polyesters and polyurethene (PUR), recycled rubbers based on thermoplastic elastomers or based on recycled crosslinked rubber, such as that resulting from the recycling of tires, and their blends.

The molecule carrying associative groups can be introduced into a plastic and in particular into a polymer formulation at a concentration of between 0.1 and 300 parts by weight per 100 parts by weight of polymer and advantageously at a level of 1 to 150 parts by weight per 100 parts by weight of polymer.

Some molecules carrying associative groups which can be used as plasticizer are novel. Another subject matter of the invention is a product corresponding to one of the following formulae (4) and (5):

(4)

(5)

in which:
m represents an integer chosen from 0, 1, 2 and 3,
n represents an integer chosen from 1 or 2 or 3,
(A) represents:
(i) an aliphatic or aromatic ring comprising 5 or 6 carbon atoms, the carbon atoms of said chain and/or of said ring optionally being replaced by one or more atoms chosen from a nitrogen atom, a sulfur atom or oxygen atom, or (ii) a linear or branched and optionally unsaturated carbon-based chain comprising an aliphatic or aromatic ring having 5 or 6 carbon atoms, the carbon atoms of said chain and/or said ring optionally being replaced by one or more atoms chosen from a nitrogen atom, a sulfur atom and an oxygen atom, or (iii) a linear or branched carbon-based chain comprising more than 5 carbon atoms, advantageously from 6 to 10 carbon atoms, and optionally an ether or ester functional group;

(B) comprises an amide, ester, imine, ether, sulfonamide, sulfide, phosphate, carbonate, urethane or biurea functional group, it being understood that, when several units (B) are present, these can be identical or different; and (C) represents an associative group comprising a dinitrogenous or trinitrogenous heterocycle as defined above, it being understood that, when several units (C) are present, these can be identical or different.

Advantageously, (A) comprises an aromatic or aliphatic ring, for example a benzyl or cyclohexyl ring.

Advantageously, (B) comprises a functional group chosen from an amide, ester, ether or sulfonamide functional group.

Advantageously, (C) represents an associative group chosen from an imidazolidinyl, bis-ureyl or ureido-pyrimidyl group, advantageously an imidazolidinyl group.

The above compounds can be prepared by reacting the precursor molecules of the above (A) and (C) groups, which by reaction form one or more bonding functional groups (B).

A precursor molecule of the (C) group is in particular a reactive group of formula (1), (2) or (3) as defined above.

One or both precursor molecules of (A) and/or (C) can carry a reactive functional group chosen from amine, alcohol, acid, acid halide, sulfonyl anhydride halide, epoxy, isocyanate, mercaptan, aldehyde, ketone, carbonate, phosphate or urea capable of forming one or more bonding functional groups (B) chosen from an amide, ester, ether, sulfonamide, sulfide, phosphate, carbonate, urethane or biurea functional group and advantageously chosen from amide, ester, ether or sulfonamide.

The reaction which makes it possible to attach the associative group to the molecule which will become, after reaction, the molecule carrying associative groups and in particular the molecule of formula 4 or 5 above can be carried out in bulk or by reaction in a solvent phase, depending on the nature of the reactants. The reaction conditions (presence or absence of solvent, reaction temperature, reaction time) thus vary according to these reactants. The examples below illustrate this reaction.

Preferred products according to the invention correspond to the following formulae (6) and (7):

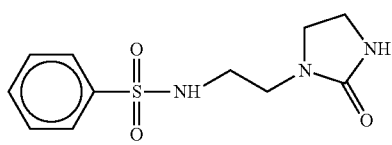

(6)

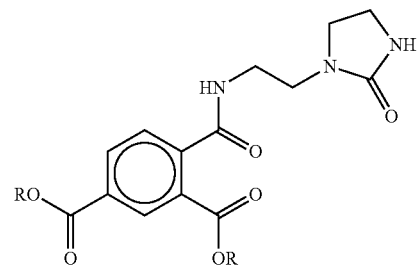

(7)

in which R represents a linear or branched alkyl chain comprising from 1 to 20 and advantageously from 8 to 13 carbon atoms and optionally comprising unsaturations.

A better understanding of the invention will be obtained in the light of the following examples and from the following FIG. 1, which are given for purposes of illustration only and which are not intended to restrict the scope of the invention defined by the appended claims.

Example 1

Preparation of a Plasticizing Product According to the Invention

Butylbenzenesulfonamide (BBSA) is a compound used as plasticizer for polyamide. It exhibits a very good plasticizing effect but has a major tendency to migrate towards the surface or the interfaces of the manufactured articles based on polyamide formulations in which it is present. Specifically, this product is rapidly extracted from the polyamides, which thus lose their flexibility. The inventors have shown that a benzenesulfonamide compound derived from UDETA exhibits excellent plasticizing properties and a low tendency to migrate.

Synthesis 33.6 g of UDETA and 50.5 g of benzenesulfonyl chloride (subsequently referred to as PhSO2Cl) are added to a beaker containing 500 ml of distilled water and 30 grams of sodium hydroxide (NaOH). The reaction is carried out at ambient temperature for 3 hours. As PhSO2Cl is immiscible with water, it forms droplets at the bottom of the beaker. At the end of these 3 hours, a homogeneous solution is obtained (disappearance of the PhSO2Cl droplets). A 20% hydrochloric acid solution is added to the reaction medium until the pH of the solution is acidic. A white precipitate then appears, it is washed twice with distilled water and then dried under vacuum at 50° C. for 12 hours. 33.8 g of product are then recovered.

The product is subsequently analyzed by GC-MS. A first study without derivation is carried out after dissolving from 3 to 5 mg of sample in 1 ml of ethanol under cold conditions. The solution is injected in split mode into a TraceGC chromatograph sold by ThermoFisher equipped with a column of BPX5 type (L=25 m, film of 0.25 μm and diameter of 220 μm), the injector is at 250° C. and the ratio of split type is 1/100. The temperature program applied is 2 minutes at 70° C., followed by heating up to 300° C. at 10° C./min; this temperature is subsequently maintained for 10 minutes. The gas flow rate is 1 ml/min. The mass spectrometer used is a DSQII device sold by ThermoFisher operating in EI+ mode (70 eV) with a source at 250° C. The m/z range studied is between 20 and 400 and the resolution (FC43 at 50% valley) is 1000. The analysis shows a very pure product which will be referred to as BS-UDETA, of formula (6). No impurity is detected and a derivation was thus also carried out.

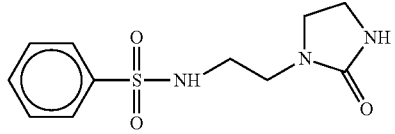

(6)

The derivation carried out on the product was a silylation on 3 to 5 mg of sample using 500 µl of acetonitrile, 300 µl of BSTFA/TMCS(N,O-bis(trimethyl-silyl)trifluoroacetamide/trimethylchlorosilane) and 30 µl of TEA (triethylamine) at 95° C. for 2 h. The GC-MS analysis was subsequently carried out according to the method described above. Again, only compounds corresponding to BS-UDETA or to the silylation product are detected. These analyses make it possible to find that the product synthesized is very pure and corresponds to BS-UDETA.

Example 2

Preparation of PA/BS-UDETA Blends

Polyamide 11 (Rilsan® BMNO, sold by Arkema) and plasticizer are blended using a microextruder of DSM® brand having a capacity of 15 cm3. The temperature of the walls is set at 210° C. and the material temperature is measured at 200° C. The stirring speed is set at 100 rpm for 2 minutes. Flushing with nitrogen is used. The material is subsequently injected to give tensile test specimens using a micro-injection molding machine of DSM® brand (nozzle temperature: 210° C., temperature of the mold: 50° C., holding time: 15 s).

2 blends are produced: the first (blend 1) contains 8% of BBSA and 92% of BMNO and the second (blend 2) contains 8% of BS-UDETA and 92% of BMNO.

Example 3

Demonstration of Plasticizing Effect in the Blends

The 2 blends, and also BMNO alone, were analyzed using a DMA 2980® dynamic mechanical analysis device sold by TA Instruments, equipped with a clamping jaw for tensioning and with cooling by liquid nitrogen. The frequency is set at 1 Hz and the heating rate at 3° C./min. Curves representing the E' modulus, measured in MPa, as a function of the temperature, in ° C., are represented in FIG. 1. The plasticizing effect of the 2 blends is comparable. Specifically, the fall in modulus which occurs, approximately 45° C., is the same for blend 1 (gray curve) and blend 2 (dotted curve) and is much lower than the fall observed for BMNO alone, approximately 60° C. (black curve). The plasticizing effects of the BBSA and BS-UDETA are thus very similar. This example demonstrates the plasticizing effect of the product according to the invention.

Example 4

Study of the Deplasticization by TGA

Tests were carried out using a thermogravimetric analyzer TGA TG 209 F1 sold by Netzsch. A gradient of 50° C./min is produced in order to bring the sample to 230° C. and then the temperature is maintained for 2 hours. The entire procedure is carried out while flushing with nitrogen.

The loss in weight measured at the end of the test, after two hours at 230° C., by TGA, is presented in table 1.

TABLE 1

| | Loss in weight |
|---|---|
| BMNO | 1% |
| Blend 1 | 6% |
| Blend 2 | 2.2% |

The BMNO losses a small amount of weight due to the loss of water. It is seen that blend 2 losses much less weight than blend 1. For these products, the loss in weight is due to the departure of water (approximately 1%) and plasticizer (remainder of the loss). This result shows that BS-UDETA exhibits a lower migration/volatization than BBSA under these conditions.

Example 5

Study of the Deplasticization in an Oven Under Vacuum

The 2 blends were placed in an oven under vacuum (vacuum of between 10 and 30 mbar) at 150° C. for 3 weeks and the loss in weight is monitored. At each weighing, the samples are wiped in order to remove all the plasticizer which might be present at the surface. At the end of these 3 weeks, all the plasticizer initially present in the compositions has migrated to the surface of the samples and has thus been removed. The rates of deplasticization are compared for all the samples (the content of plasticizer lost is measured at a fixed time).

The results are presented in table 2. It is found that the loss of plasticizer is much slower for blend 2 than for blend 1 (for example a loss of 80% of BBSA occurs between 25 and 49 hours after the beginning of the test, whereas, for BS-UDETA, it occurs only after 144 hours). These results further show that BS-UDETA exhibits a much lower migration than BBSA, while having a very similar plasticizing power.

TABLE 2

| Time in hours | Blend 1 | Blend 2 |
|---|---|---|
| 0 | 0% | 0% |
| 25 | 74% | 26% |
| 49 | 84% | 40% |
| 144 | 97% | 81% |
| 216 | 99% | 90% |
| 384 | 100% | 99% |
| 504 | 100% | 100% |

Example 6

Preparation of a Plasticizing Product According to the Invention

Trioctyl Trimellitate+UDETA

The product according to the invention of formula (8) is obtained according to the following reaction scheme.

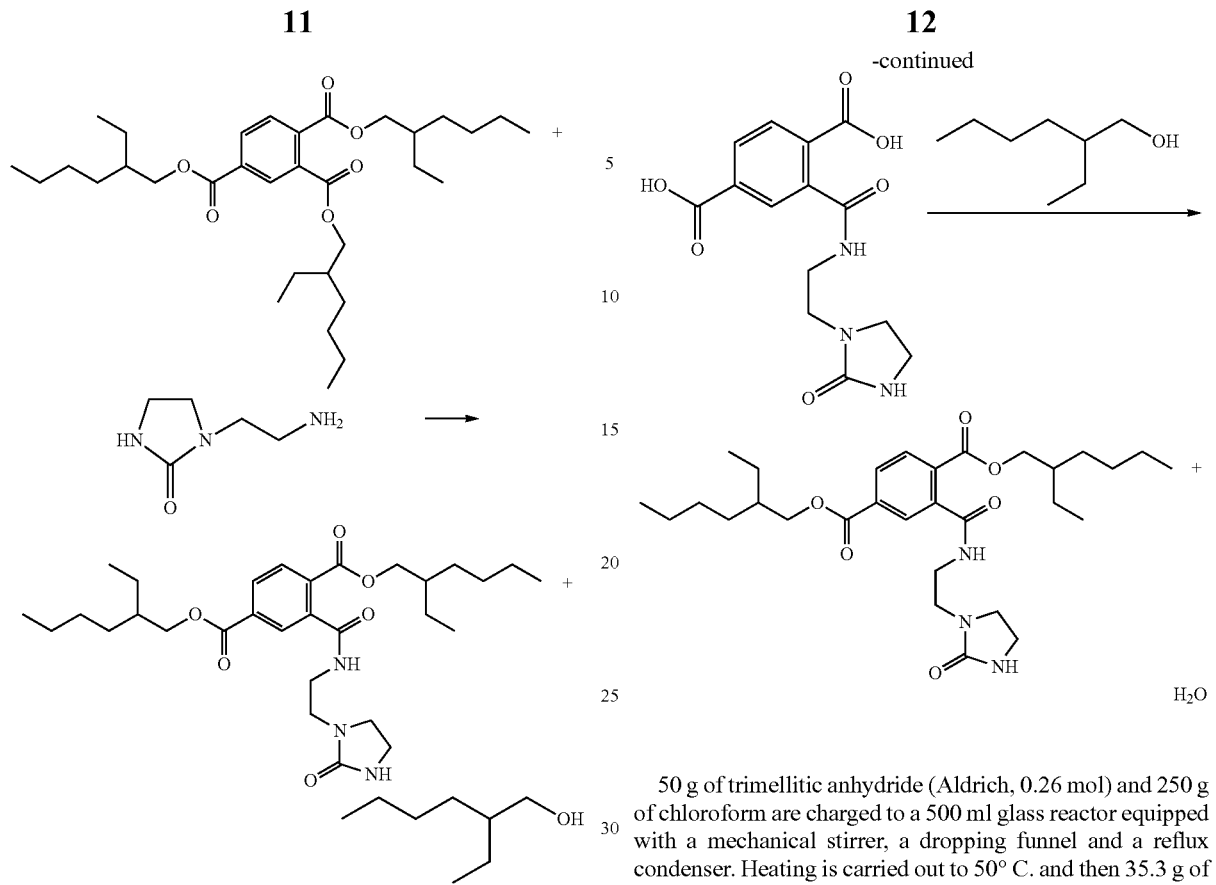

150 g of trioctyl trimellitate (Aldrich, 0.27 mol) and 36.7 g of 95% UDETA (Arkema, 0.27 mol) are charged to a 500 ml glass reactor equipped with a mechanical stirrer, a Dean and Stark apparatus surmounted by a reflux condenser and a vacuum connection. The assembly is brought to a pressure of 100 mbar and heating is carried out at 150° C. for 4 hours in order to remove the 2-ethylhexanol. 155 g of a product of formula (8), comprising trioctyl trimellitate modified by UDETA, are thus recovered.

Example 7

Preparation of a Plasticizing Product According to the Invention

Trimellitic Anhydride+UDETA+2-Ethylhexanol

The product according to the invention of formula (9) is obtained according to the following reaction scheme:

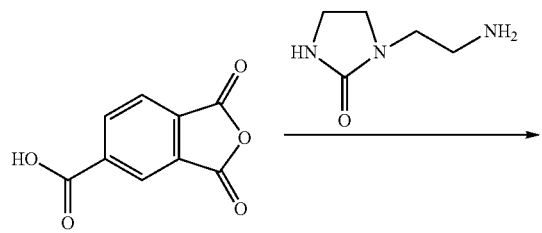

50 g of trimellitic anhydride (Aldrich, 0.26 mol) and 250 g of chloroform are charged to a 500 ml glass reactor equipped with a mechanical stirrer, a dropping funnel and a reflux condenser. Heating is carried out to 50° C. and then 35.3 g of 95% UDETA (0.26 mol) are added. The reaction is allowed to take place over 2 hours, then cooling is carried out and the reaction mixture is filtered. The solid obtained is dried in a vacuum oven at 40° C.

The product is transferred into a 500 ml glass reactor equipped with a mechanical stirrer and a Dean and Stark apparatus surmounted by a reflux condenser. 67.6 g of 2-ethylhexanol (Aldrich, 0.52 mol) and 0.25 g of methanesulfonic acid (Aldrich) are added. Heating is carried out at 135° C. for 6 hours in order to remove the water. 140 g of a product of formula (9), comprising octyl trimellitate modified by UDETA, are thus recovered.

The invention claimed is:

1. A method of plasticizing a plastic, comprising:
adding a plasticizer to the plastic, wherein the plasticizer comprises a molecule having at least one associative group comprising a dinitrogenous or trinitrogenous heterocycle, wherein the associative group is selected from the group consisting of imidazolidinyl, bis-ureyl, and ureido-pyrimidyl groups;
wherein said plasticizer is obtained by reacting, with a precursor molecule, an associative group selected from the group consisting of formula (1), (2), and (3):

(1)

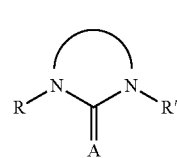

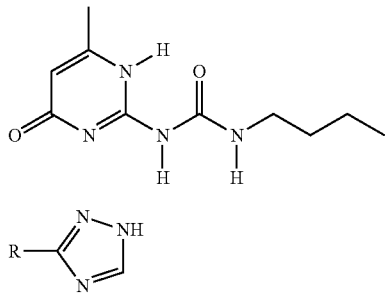

wherein:
- R comprises a group of formula T-(G)$_n$-, wherein T is a reactive functional group capable of forming a covalent bond with the precursor molecule, n has a value of 0 or 1, and G is a linear or branched C$_1$-C$_{24}$ alkylene chain optionally interrupted by one or more nitrogen atoms;
- R' is a hydrogen atom, and
- A is chosen from an oxygen or sulfur atom wherein the precursor molecule does not comprise a polymer.

2. The method of claim 1, wherein the associative group is an imidazolidinyl group.

3. The method of claim 1, wherein G is a linear or branched C$_1$-C$_{10}$ alkylene chain optionally interrupted by one or more nitrogen atoms.

4. The method of claim 1, wherein A is an oxygen atom.

5. The method of claim 1, wherein the reactive functional group T is selected from the group consisting of acid, anhydride, alcohol, mercaptan, amine, epoxy, and isocyanate functional groups.

6. The method of claim 1, wherein the associative group is selected from the group consisting of
- 1-(2-aminoethyl)imidazolidone, 1-(2-hydroxyethyl)imidazolidone,
- 1-(2-[(2-aminoethyl)amino]ethyl)imidazolidone,
- 1-(2-[2-{2-aminoethylamino}ethylamino]ethyl)imidazolidone, and
- N-(6-aminohexyl)-N'-(6-methyl-4-oxo-1,4-dihydropyrimidin-2-yl)urea.

7. The method of claim 1, wherein the precursor molecule comprises a linear or branched alkylene chain comprising from 1 to 70 carbon atoms, optionally interrupted by one or more aromatic or aliphatic rings.

8. The method of claim 7, wherein the precursor molecule comprises a linear or branched alkylene chain comprising from 1 to 50 carbon atoms, optionally interrupted by one or more aromatic or aliphatic rings.

9. The method of claim 7, wherein the precursor molecule comprises a linear or branched alkylene chain comprising from 1 to 30 carbon atoms, optionally interrupted by one or more aromatic or aliphatic rings.

10. The method of claim 7, wherein the precursor molecule comprises a linear or branched alkylene chain comprising from 1 to 10 carbon atoms, optionally interrupted by one or more aromatic or aliphatic rings.

11. The method of claim 1, wherein the precursor molecule is selected from the group consisting of adipates, azelates, sebacates, phthalates, trimellitates, phosphates, citrates, benzenesulfonamide derivatives, glycolic esters, epoxidized soybean oil, epoxidized linseed oil, and epoxidized pine oil fatty acids.

12. The method of claim 11, wherein the precursor molecule is selected from the group consisting of butylbenzenesulfonamide and hydroxypropylbenzenesulfonamide.

13. The method of claim 1, wherein the plasticizer has a molecular weight ranging from 30 to 2000 g/mol.

14. The method of claim 13, wherein the plasticizer has a molecular weight ranging from 30 to 1000 g/mol.

15. The method of claim 13, wherein the plasticizer has a molecular weight ranging from 30 to 500 g/mol.

16. The method of claim 1, wherein the plastic is selected from the group consisting of cellulose derivatives, polyamides, polymers composed of monomers obtained by reaction of an aliphatic, cycloaliphatic or aromatic C$_6$-C$_{14}$ dicarboxylic acid with an aliphatic, cycloaliphatic, arylaliphatic or aromatic C$_6$-C$_{22}$ diamine, acrylic homo- and copolymers, polycarbonate, styrene polymers, halogenated vinyl polymers, polyethers and polymers of vegetable or bacterial origin, polyvinyl acetate, polyvinylbutyral, elastomers, polybutadiene, synthetic polyisoprene, polychloroprene, which are optionally hydrogenated, polyisobutylene, block copolymers of polybutadiene and isoprene with styrene, which are optionally hydrogenated, hydrogenated SBS, poly(styrene-b-butadiene-b-methyl methacrylate), which is optionally hydrogenated, poly(methyl methacrylate-b-butyl acrylate-b-methyl methacrylate), poly(styrene-b-butyl acrylate-b-styrene), random copolymers of butadiene with styrene and acrylonitrile, which are optionally hydrogenated, butyl or halogenated rubbers, polyethylenes, polypropylenes, silicone elastomers of general formula —(Si(R)(CH$_3$)—O)$_n$— with CH$_3$ and R bonded to the silicon atom and the latter bonded to the oxygen atom, wherein R is chosen from methyl, phenyl, vinyl, trifluoropropyl, and 2-cyanoethyl radicals, ethylene/vinyl alcohol copolymers, ethylene/propylene and ethylene/propylene/diene copolymers, copolymers of ethylene with acrylic and vinyl monomers, resins based on methacrylic esters, polyamide/polyether multiblock copolymers, elastomers based on polyesters and polyurethane, recycled rubbers based on thermoplastic elastomers or based on recycled crosslinked rubber, and mixtures thereof.

17. The method of claim 16, wherein the plastic is selected from the group consisting of poly(lactic acid), polyhydroxyalkanoates, natural rubber, poly(styrene-b-butadiene), poly(styrene-b-butadiene-b-styrene), poly(styrene-b-isoprene-b-styrene), poly(styrene-b-(isoprene-stat-butadiene)-b-styrene), poly(styrene-b-isoprene-b-butadiene-b-styrene), copolymers of ethylene and vinyl acetate, copolymers of ethylene, vinyl acetate and maleic anhydride, copolymers of ethylene and acrylic ester, copolymers of ethylene, acrylic ester and maleic anhydride, copolymers of ethylene, acrylic ester and functional acrylic ester, copolymers of ethylene, acrylic ester and glycidyl acrylate, or copolymers of ethylene, acrylic ester and glycidyl methacrylate.

\* \* \* \* \*